(No Model.)
E. W. WILSON.
CABLE RAILWAY.
No. 384,550. Patented June 12, 1888.
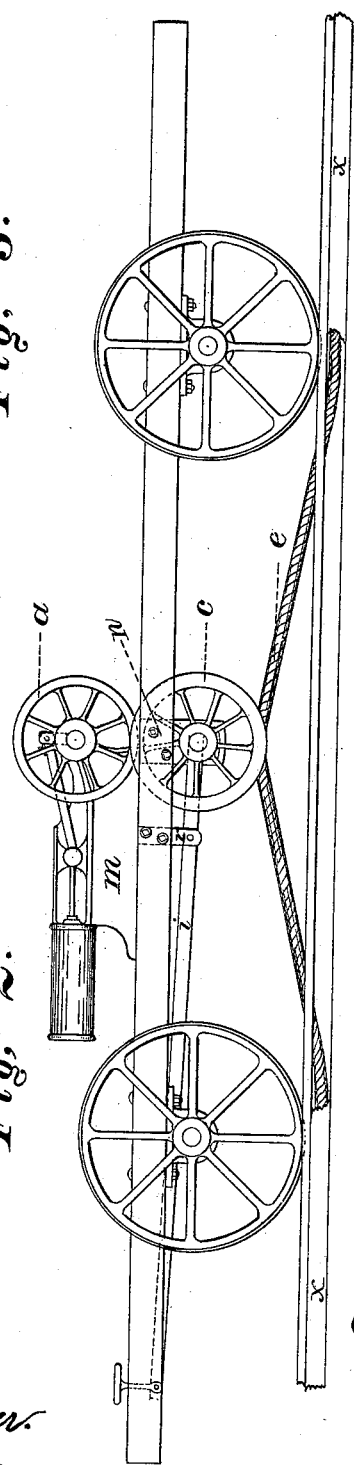
WITNESSES:
Evan R. Faulkner.
Frank E. Pierce.
Edgar W. Wilson,
INVENTOR.
BY C. H. Murray, ATTY.
N. PETERS, Photo-Lithographer, Washington, D. C.

UNITED STATES PATENT OFFICE.

EDGAR WM. WILSON, OF DENVER, COLORADO.

CABLE RAILWAY.

SPECIFICATION forming part of Letters Patent No. 384,550, dated June 12, 1888.

Application filed March 5, 1888. Serial No. 266,241. (No model.)

*To all whom it may concern:*

Be it known that I, EDGAR WM. WILSON, a citizen of the United States, residing at Denver, in the county of Arapahoe and the State of Colorado, have invented certain new and useful Improvements in Cable Railways; and I hereby declare that the following specification and accompanying drawings contain such a full, clear, and exact description of the same as will enable others skilled in the art to which the invention appertains to make and use the same.

The invention relates to a new device for drawing cars over street-railways.

In the accompanying drawings like letters refer to similar parts in any of the figures.

Referring to the drawings, Figure 1 shows a side view of the car-bottom, a motor in place with its friction bearing-pulley in contact with the revolving drum-pulley carrying the cable. Fig. 2 is an edge view of the friction bearing-pulley in contact with the cable drum-pulley, with the cable on the drum. Fig. 3 is a reverse side view of the cable drum-pulley, exhibiting the slotted bearing in which the shaft of the pulley works.

In Fig. 1, $m$ is a motor carrying the friction bearing-pulley $a$. $c$ is a rotating drum-pulley, carrying the cable $e$ and operated by $a$ when in contact. $i$ is a lever hung on the piece $r$ by a bolt, the working of which by any convenient mechanical device throws the pulley $c$ into or out of bearing. $x$ is a simple slotted pipe continuous with the cable to hold and protect it from injury. In Figs. 1 and 2 $n$ is a slotted bearing in which the journal of $c$ works as $c$ is lowered or raised. It is bolted to the frame-work of the car-bed.

To make the invention operative, the friction drum-pulley $c$, carrying the cable $e$, is brought into bearing with the revolving pulley $a$ by the lever $i$, which causes the drum-pulley to rotate, and by so doing it draws upon the fixed cable $e$, thus moving the car along.

The advantages of the invention are simplicity of operation, the direct application of the power to its work, and the small loss through friction in its mechanical parts.

Having thus described the character of my invention, what I claim as new, and desire to secure by Letters Patent, is—

In cable railways, the motor $m$, provided with the friction driving-pulley $a$, in combination with the friction drum-pulley $c$, carrying the dormant cable $e$, and provided with the lever $i$, all operated as set forth, and for the purpose indicated.

EDGAR WM. WILSON.

Witnesses:
FRANK E. PIERCE,
E. R. FAULKNER.